(12) United States Patent
Inagaki et al.

(10) Patent No.: US 8,149,026 B2
(45) Date of Patent: Apr. 3, 2012

(54) DRIVER CIRCUIT AND ADJUSTMENT METHOD THEREFOR

(75) Inventors: Yasukuni Inagaki, Kasugai (JP); Akira Mashimo, Tokorozawa (JP)

(73) Assignee: Fujitsu Semiconductor Limited, Yokohama (JP)

( * ) Notice: Subject to any disclaimer, the term of this patent is extended or adjusted under 35 U.S.C. 154(b) by 98 days.

(21) Appl. No.: 12/826,317

(22) Filed: Jun. 29, 2010

(65) Prior Publication Data

US 2011/0006812 A1 Jan. 13, 2011

(30) Foreign Application Priority Data

Jul. 8, 2009 (JP) .................................. 2009-162024

(51) Int. Cl.
*H03B 1/00* (2006.01)
(52) U.S. Cl. ............................ 327/108; 327/319; 326/63
(58) Field of Classification Search ........................ None
See application file for complete search history.

(56) References Cited

U.S. PATENT DOCUMENTS 6,894,470 B2 * 5/2005 Umemoto et al. ............. 323/281
6,946,848 B2 * 9/2005 Tauber et al. .................. 324/601

FOREIGN PATENT DOCUMENTS

JP 2005-514857 A 5/2005
WO WO-03/058842 A1 7/2003

* cited by examiner

*Primary Examiner* — An Luu
(74) *Attorney, Agent, or Firm* — Arent Fox LLP

(57) ABSTRACT

A driver circuit includes an output section; a voltage-dividing section configured to divide a first voltage at a coupling point between the output section and a termination resistor; a comparison section configured to compare a voltage difference with one of the first voltage and a second voltage, the voltage difference being a difference between the second voltage at a coupling point between the termination resistor and a transmission path and a third voltage output from the voltage-dividing section; and an adjustment section configured to adjust a voltage division ratio of the voltage-dividing section on the basis of the comparison result obtained in the comparison section.

12 Claims, 9 Drawing Sheets

DRIVER CIRCUIT AND ADJUSTMENT METHOD THEREFOR

CROSS-REFERENCE TO RELATED APPLICATION

This application is based upon and claims the benefit of priority of the prior Japanese Patent Application No. 2009-162024, filed on Jul. 8, 2009, the entire contents of which are incorporated herein by reference.

FIELD

Aspects of the present invention relate to a driver circuit and an adjustment method for the driver circuit.

BACKGROUND

A plurality of devices communicating with one another may individually include driver circuits used for transmitting and receiving signals. A type of full-duplex communication uses a cable, such as a coaxial cable, whose number of cores (the number of signal lines) is small, for connecting the plurality of devices to one another. This type of full-duplex communication is described, for example, in Japanese Unexamined Patent Application Publication (Translation of PCT Application) No. 2005-514857.

SUMMARY

Aspects include a driver circuit having an output section; a voltage-dividing section configured to divide a first voltage at a coupling point between the output section and a termination resistor; a comparison section configured to compare a voltage difference with one of the first voltage and a second voltage, the voltage difference being a difference between the second voltage at a coupling point between the termination resistor and a transmission path and a third voltage output from the voltage-dividing section; and an adjustment section configured to adjust a voltage division ratio of the voltage-dividing section on the basis of the comparison result obtained in the comparison section.

Aspects may further comprise an adjustment method for a driver circuit including comparing a voltage difference with one of a first voltage and a second voltage, the voltage difference being a difference between a third voltage, obtained by dividing the first voltage at a coupling point between an output section and a termination resistor, and the second voltage at a coupling point between the termination resistor and a transmission path; and adjusting a voltage division ratio used for generating the third voltage, on the basis of the comparison result.

The object and advantages of the invention may be realized and attained by the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
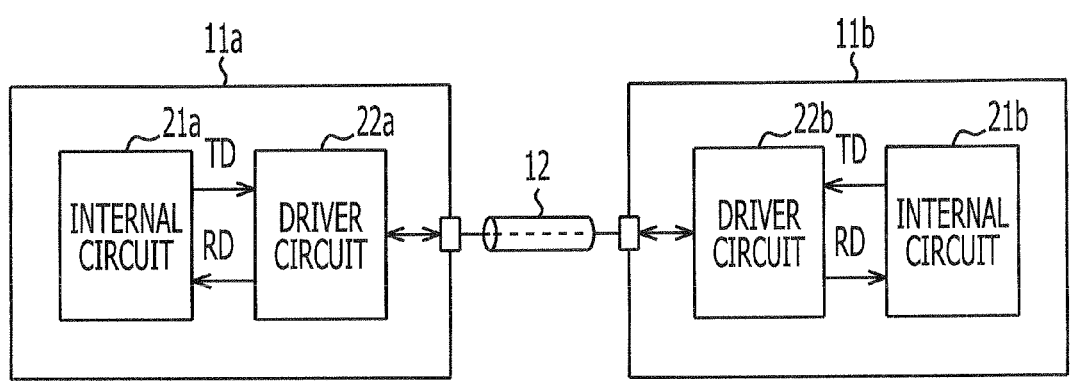
FIG. 1 is a block diagram illustrating a communication system.

An exemplary implementation in accordance with aspects of the present invention will be described with reference to FIGS. 1 to 9. As shown in FIG. 1, a communication system includes a plurality of electronic devices 11a and 11b (two devices in FIG. 1) and the two electronic devices 11a and 11b are coupled to each other through a transmission line 12 so as to intercommunicate with each other.

The electronic device 11a includes an internal circuit 21a and a driver circuit 22a. The internal circuit 21a performs a function of the electronic device 11a. The internal circuit 21a outputs transmission data TDa to the driver circuit 22a according to the function. The driver circuit 22a outputs a voltage signal on the basis of the transmission data TDa. The voltage signal is transmitted to an electronic device 11b, which is a communication partner, through a transmission line 12. The driver circuit 22a outputs reception data RDa that is generated on the basis of the voltage of a signal received through the transmission line 12. The internal circuit 21a receives the reception data RDa output from the driver circuit 22a.

The electronic device 11b includes an internal circuit 21b and a driver circuit 22b. The internal circuit 21b outputs transmission data TDb and receives reception data RDb. The driver circuit 22b outputs a signal based on the transmission data TDb, and outputs the reception data RDb based on a signal received through the transmission line 12.

The transmission line 12 includes a single line. The single line forms one transmission path used for transmitting a signal and includes one conductive wire or a plurality of conductive wires. In the implementation, the transmission line 12 is a coaxial cable. The electronic devices 11a and 11b transmit and receive a signal using the cable core of the coaxial cable and the shield wire of the coaxial cable is coupled to, for example, the ground.

The driver circuits 22a and 22b can perform full-duplex communication through the single line. When any one of the driver circuits 22a and 22b (for example, 22a) transmits a signal, the other of the driver circuits 22a and 22b (22b) can transmit a signal. Accordingly, when outputting a transmission signal whose voltage is based on the transmission data TD, the driver circuit 22a generates reception data RD on the basis of a reception signal supplied from the transmission line 12. At this time, since transmission and reception are performed through the single line included in the transmission line 12, a transmission signal based on the transmission data TDa is superposed on the reception signal and input. A similar phenomenon may occur in the driver circuit 22b. Therefore, the transmission signal's influence on the reception signal is reduced in each of the driver circuits 22a and 22b.

Figure 2:
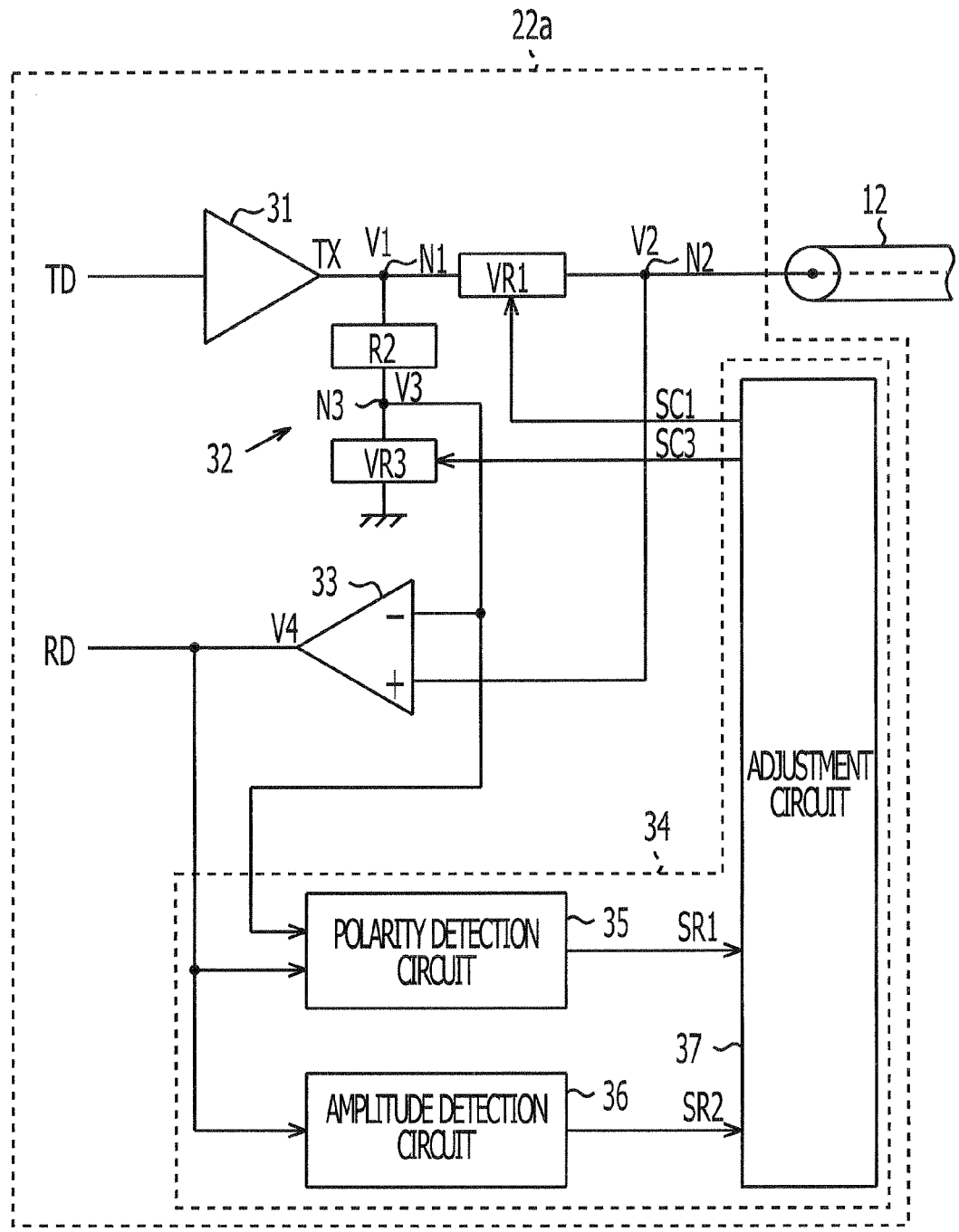
FIG. 2 is an explanatory diagram illustrating intercommunication.

As shown in FIG. 2, the driver circuit 22a includes an output section 31, a voltage-dividing section 32, an input section 33, a control section 34, and a variable resistor VR1. On the basis of the transmission data TD, the output section 31 outputs a signal Tx whose voltage corresponds to the transmission data TD. For example, the transmission data TD is binary data. In addition, when the transmission data TD is "0", the output section 31 outputs the signal Tx corresponding to a ground level, and when the transmission data TD is "1", the output section 31 outputs the signal Tx corresponding to a first voltage level.

The output terminal of the output section 31 is coupled to the variable resistor VR1. A resistance value between the first terminal and the second terminal of the variable resistor VR1 varies in response to a control signal SC1 supplied to a control terminal. The first terminal of the variable resistor VR1 is coupled to the output section 31, and the second terminal of the variable resistor VR1 is coupled to the first terminal of the transmission line 12. The second terminal of the transmission line 12 is coupled to the driver circuit 22b in the electronic device 11b, as shown in FIG. 1. The transmission signal output from the driver circuit 22b is supplied to the driver circuit 22a through the transmission line 12. The transmission line 12 has characteristic impedance. The variable resistor VR1 is a termination resistor inserted in series between the output section 31 as a signal source and the transmission line 12, and matches the impedance of the output section 31 to the characteristic impedance of the transmission line 12.

A node N1 between the output section 31 and the variable resistor VR1 is coupled to the voltage-dividing section 32, and a node N2 between the variable resistor VR1 and the transmission line 12 is coupled to the input section 33. The voltage-dividing section 32 includes a fixed resistor R2 and a variable resistor VR3, and the resistors R2 and VR3 are coupled in series between the node N1 and the ground. The resistance value between the first terminal and the second terminal of the variable resistor VR3 varies in response to a control signal SC3 supplied to a control terminal. A node N3 between the fixed resistor R2 and the variable resistor VR3 is coupled to the input section 33. The voltage-dividing section 32 produces a voltage at the node N3, the voltage obtained by dividing the voltage of the node N1 (referred to as first voltage V1, hereinafter) using a voltage division ratio based on the resistance values of the fixed resistor R2 and the variable resistor VR3. A voltage at the node N3 is referred to as third voltage V3. Since the node N1 is located between the output section 31 and the variable resistor VR1, the voltage V1 of the node N1 corresponds to the voltage of the signal Tx output from the output section 31. The voltage-dividing section 32 divides the voltage of the output signal Tx using the voltage division ratio based on both the resistance values of the fixed resistor R2 and the variable resistor VR3 and generates the third voltage V3.

Figure 4:
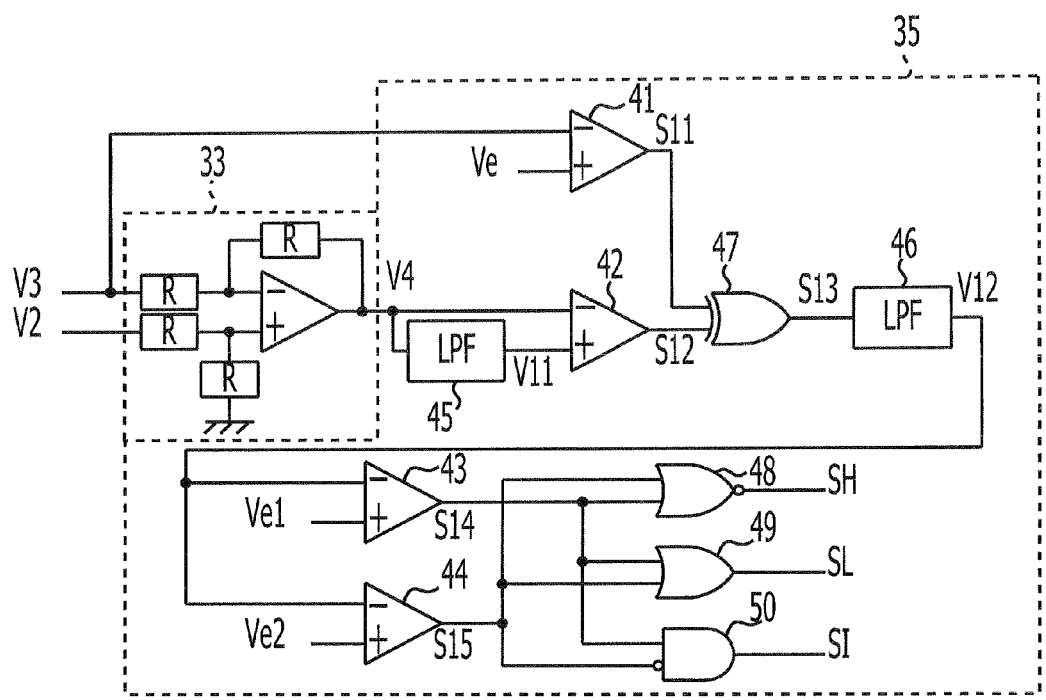
FIG. 4 is a circuit diagram illustrating a polarity detection circuit.

The input section 33 is an operational circuit and includes two input terminals. The first input terminal is coupled to the node N2, and the second input terminal is coupled to the node N3. Accordingly, the second voltage V2 of the node N2 and the third voltage V3 of the node N3 are supplied to the input section 33. The input section 33 outputs a voltage V4 corresponding to a difference between the two voltages V2 and V3. As shown in FIG. 4, the input section 33 is a differential amplifier circuit whose gain is set to "1", and outputs the difference voltage V4 obtained by subtracting the third voltage V3 of the node N3 from the second voltage V2 of the node N2. While omitted in FIG. 4, the driver circuit 22a may include a binarization circuit (for example, comparator) used for binarizing the difference voltage V4, and the reception data RD is generated by binarizing the difference voltage V4.

The control section 34 generates the control signals SC1 and SC3 on the basis of the third voltage V3 and the fourth voltage V4, the control signals SC1 and SC3 being used for controlling the resistance values of the variable resistors VR1 and VR3, respectively. The control section 34 includes a polarity detection circuit 35, an amplitude detection circuit 36, and an adjustment circuit 37.

The polarity detection circuit 35 detects the polarity of the third voltage V3 with respect to the second voltage V2 on the basis of the third voltage V3 and the fourth voltage V4, and outputs a detection signal SR1 according to the detection result. The polarity indicates whether the voltage level of a measurement object is higher or lower than a reference voltage. In the illustration, the second voltage V2 is the reference voltage, and the third voltage is the voltage level of the measurement object. The amplitude detection circuit 36 outputs a detection signal SR2 according to the amplitude of the fourth voltage V4.

The adjustment circuit 37 generates the control signals SC1 and SC3 on the basis of the detection signals SR1 and SR2, the control signals SC1 and SC3 being used for controlling the resistance values of the variable resistors VR1 and VR3, respectively. The adjustment circuit 37 generates the control signal SC3 on the basis of the detection signal SR1, and adjusts the resistance value of the variable resistor VR3 so that the polarity of the second voltage V2 matches the polarity of the third voltage V3. The adjustment circuit 37 generates the control signal SC1 on the basis of the detection signal SR2, and adjusts the resistance value of the variable resistor VR1 so that the fourth voltage V4 becomes a minimum.

Figure 3:
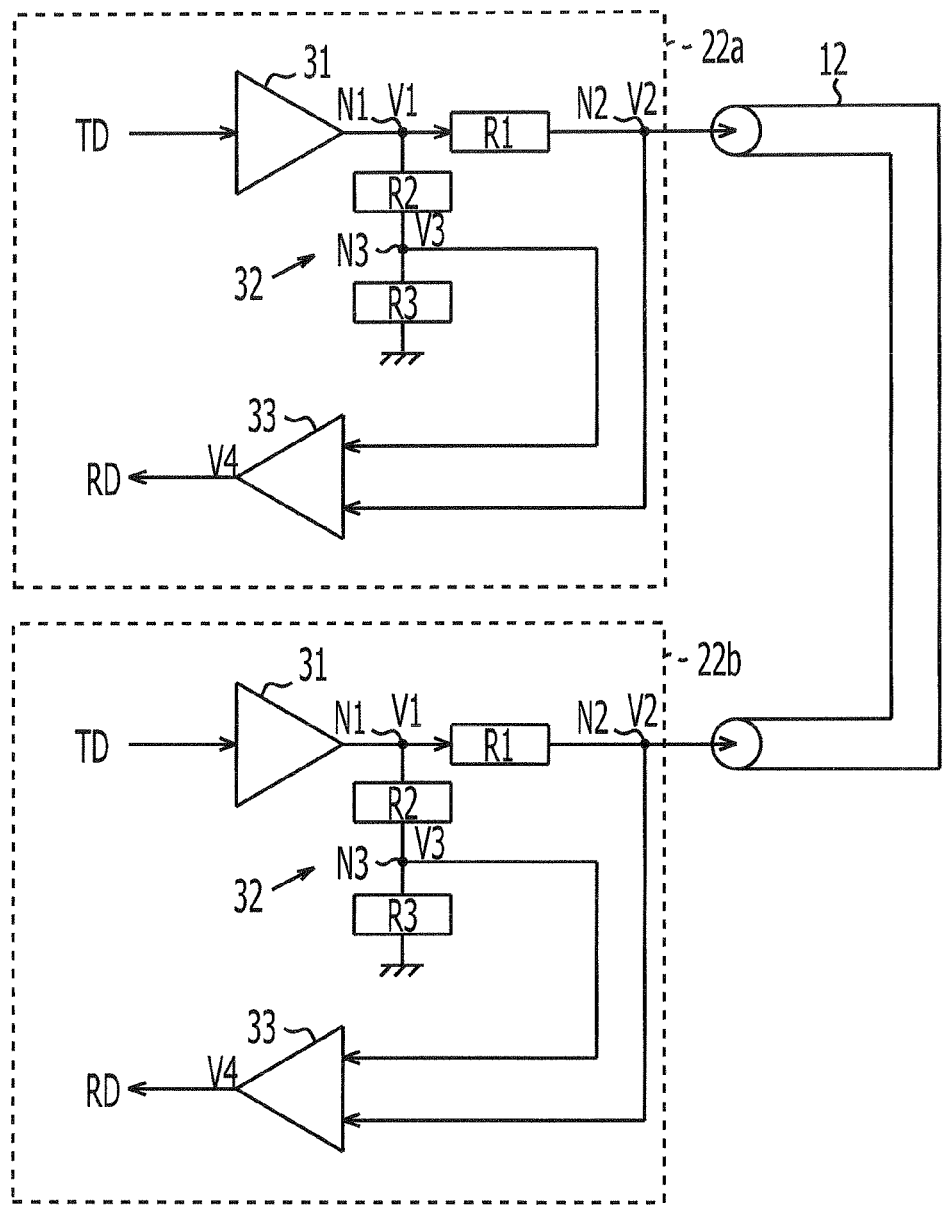
FIG. 3 is a block circuit diagram illustrating a portion of a communication device.

FIG. 3 illustrates a circuit in the driver circuit 22a shown in FIG. 1, which relates to the transmission signal and the reception signal. In FIG. 3, the variable resistors VR1 and VR3 shown in FIG. 2 are referred to as fixed resistors R1 and R3, respectively. Since the driver circuit 22b that is a communication partner has the approximately same circuit configuration as that of the driver circuit 22a, the same symbols are assigned to circuit sections in the driver circuit 22b.

The output section 31 in the driver circuit 22a outputs the signal Tx on the basis of the transmission data TD. Accordingly, the amplitude of a voltage at the node N1 is the voltage V1 of the signal Tx. The signal Tx is supplied to the driver circuit 22b through the resistor R1 and the transmission line 12. Accordingly, the voltage V2 at the node N2 is an electrical potential established in accordance with both the resistance value of the resistor R1 and the impedance between the node N2 and a receiving end (the characteristic impedance of the transmission line 12 is included).

In the same way, a signal Tx output from an output section 31 in the driver circuit 22b is supplied to the input section 33 in the driver circuit 22a through a resistor R1 and the transmission line 12. When signals Tx are simultaneously output from the driver circuits 22a and 22b, respectively, a voltage due to the signal Tx output from the driver circuit 22b and a voltage at the node N2, which is based on the signal Tx output from the output section 31 in the driver circuit 22a, are applied to the input terminal of the input section 33 in the driver circuit 22a. A voltage at the node N2, which is based on the voltage output from the output section 31 in the communication partner, and another voltage at the node N2, which is based on the voltage output from the output section 31 in the driver circuit 22a and is superposed on the one voltage, are supplied to the input section 33.

The voltage-dividing section 32 generates the third voltage V3 by dividing the voltage V1 on the basis of the resistors R2 and R3. When the communication partner does not output a signal, the voltage at the node N2, which is based on the voltage V1 output from the output section 31, and the voltage V3 obtained by dividing the voltage V1 with the voltage-dividing section 32 are supplied to the input section 33. Accordingly, when the resistance values of the resistors R2 and R3 are adjusted so that the voltage V3 generated by the voltage-dividing section 32 matches the voltage V2 at the node N2, a subtraction result obtained in the input section 33 by subtracting the voltage V3 from the voltage supplied through the node N2 turns out to be a voltage output from the communication partner.

The voltage at the node N2 is an electrical potential established in accordance with both the resistance value of the resistor R1 and the impedance between the node N2 and a receiving end (the characteristic impedance of the transmission line 12 is included). On the other hand, the divided voltage V3 is an electrical potential established in accordance with both the resistance value of the resistor R2 and the resistance value of the resistor R3. Accordingly, the ratio of the resistance value of the resistor R2 to the resistance value of the resistor R3 (resistance ratio or voltage division ratio) is adjusted to match the ratio of the resistance value of the resistor R1 to the impedance between the node N2 and the receiving end, thereby allowing the driver to remove from a reception signal the influence of a signal output by the driver itself, in the case of full-duplex communication using a single line.

FIG. 4 is a circuit diagram illustrating a polarity detection circuit. As shown in FIG. 4, a polarity detection circuit 35 includes comparators 41 to 44, low-pass filters (LPFs) 45 and 46, and logic circuits 47 to 50.

The third voltage V3 is supplied to the inverting input terminal of the comparator 41, and a reference voltage Ve is supplied to the non-inverting input terminal of the comparator 41. The reference voltage Ve is set to binarize the third voltage V3. For example, when impedance is matched, the value of the third voltage V3 turns out to be a half of the value of the first voltage Accordingly, even if impedance is mismatched, the third voltage V3 is to be adjusted to a value near a half of the value of the first voltage V1. Therefore, the third voltage V3 is initially set to a voltage that is half of the value of the fully adjusted third voltage V3 (or a quarter of the value of the first voltage V1). When impedance is matched, the second voltage V2 is determined on the basis of the output voltage V1 of the output section 31 and the impedance of a signal path through which the signal Tx is transmitted. Therefore, when impedance is matched, the determined second voltage will be, for example, half the value of the output voltage V1. The determined second voltage V2 is used as the reference voltage Ve. Accordingly, the reference voltage Ve is an ideal voltage under conditions in which impedance is matched. The comparator 41 compares the reference voltage Ve with the third voltage V3 and outputs a signal S11 corresponding to the comparison result. When the voltage V3 is higher than the reference voltage Ve, the signal S11 having a low level is output. When the voltage V3 is lower than the reference voltage Ve, the signal S11 having a high level is output.

The difference voltage V4 output from the input section 33 is supplied to the inverting input terminal of the comparator 42, and the non-inverting input terminal of the comparator 42 is coupled to the LPF 45. The difference voltage V4 is supplied to the LPF 45. The LPF 45 outputs a voltage V11 obtained by averaging the difference voltage V4. The comparator 42 compares the voltage V11 with the difference voltage V4 and outputs a signal S12 corresponding to the comparison result. In the exemplary implementation, when the voltage V4 is higher than the voltage V11, the signal S12 having a low level is output. When the voltage V4 is lower than the voltage V11, the signal S12 having a high level is output.

The logic circuit 47 is an exclusive OR circuit (EOR) and outputs a signal S13 corresponding to an operation result obtained by subjecting the signals S11 and S12 to a logical exclusive OR operation. The LPF 46 outputs a voltage V12 obtained by averaging the level of the signal S13.

The voltage V12 is supplied to the inverting input terminal of the comparator 43, and the reference voltage Ve1 is supplied to the non-inverting input terminal of the comparator 43. The reference voltage Ve1 is more than half of the voltage value of a high level signal that is output from the logic circuit 47, the difference between the reference voltage Ve1 and the half of the voltage value of the signal being a voltage value (for example, 10 mV) corresponding to a detection width used for coincidence detection. The comparator 43 compares the voltage V12 with the reference voltage Ve1 and outputs a signal S14 corresponding to the comparison result. When the voltage V12 is higher than the reference voltage Ve1, the signal S14 having a low level is output. When the voltage V12 is lower than the reference voltage Ve1, the signal S14 having a high level is output.

The voltage V12 is supplied to the inverting input terminal of the comparator 44, and the reference voltage Ve2 is supplied to the non-inverting input terminal of the comparator 44. Similar to the reference voltage Ve1, the reference voltage Ve2 is less than half of the voltage value of a high level signal that is output from the logic circuit 47, the difference between the reference voltage Ve2 and the half of the voltage value of the signal being a voltage value (for example, 10 mV) corresponding to a detection width used for coincidence detection. The comparator 44 compares the voltage V12 with the reference voltage Ve2 and outputs a signal S15 corresponding to the comparison result. When the voltage V12 is higher than the reference voltage Ve2, the signal S15 having a low level is output. When the voltage V12 is lower than the reference voltage Ve2, the signal S15 having a high level is output.

The logic circuit 48 is a NOR circuit and outputs a detection signal SH corresponding to an operation result obtained by subjecting the signals S14 and S15 to a logical NOT-OR operation. The logic circuit 49 is an AND circuit and outputs a detection signal SL corresponding to an operation result obtained by subjecting the signals S14 and S15 to a logical AND operation. The logic circuit 50 is an AND circuit and outputs a detection signal SI corresponding to an operation result obtained by subjecting the signal S14 and a signal, to which the signal S15 is logically inverted, to a logical AND operation. The detection signal SR1 includes detection signals SH, SL, and SI.

The polarity detection circuit 35 outputs a signal SR (SH, SL, and SI) corresponding to both the polarity of the third voltage V3 with respect to the second voltage V2 and the polarity of the fourth voltage V4. When the polarity of the fourth voltage V4 is positive, namely, the third voltage V3 is lower than the second voltage V2, the polarity detection circuit 35 outputs the detection signal SL having a high level and the detection signals SH and SI having low levels, respectively. When the polarity of the fourth voltage V4 is negative, namely, the second voltage V2 is lower than the third voltage V3, the polarity detection circuit 35 outputs the detection signal SH having a high level and the detection signals SL and SI having low levels, respectively. When the fourth voltage V4 is within the detection width, the polarity detection circuit 35 outputs the detection signal SI having a high level and the detection signals SH and SL having low levels, respectively.

Namely, one of the detection signals SH, SL, and SI turns out to be a predetermined level (H level) on the basis of the determination results of the polarities of the third voltage V3 and the fourth voltage (difference voltage) V4. In addition, the detection signals SH, SL, and SI indicate whether or not the third voltage (divided voltage) V3 is suitable with respect to the second voltage V2. For example, the detection signal SI indicates that the value of the fourth voltage V4 is zero or near to zero. Accordingly, the third voltage V3 turns out to be equal to or nearly equal to the second voltage V2. On the other hand, the detection signal SL indicates that the fourth voltage V4 is a positive one. Accordingly, the third voltage V3 is smaller than the second voltage V2, the difference being small. In addition, the detection signal SH indicates that the fourth voltage V4 is a negative one. Accordingly, the third voltage V3 is larger than the second voltage V2, the difference being large.

Figure 5:
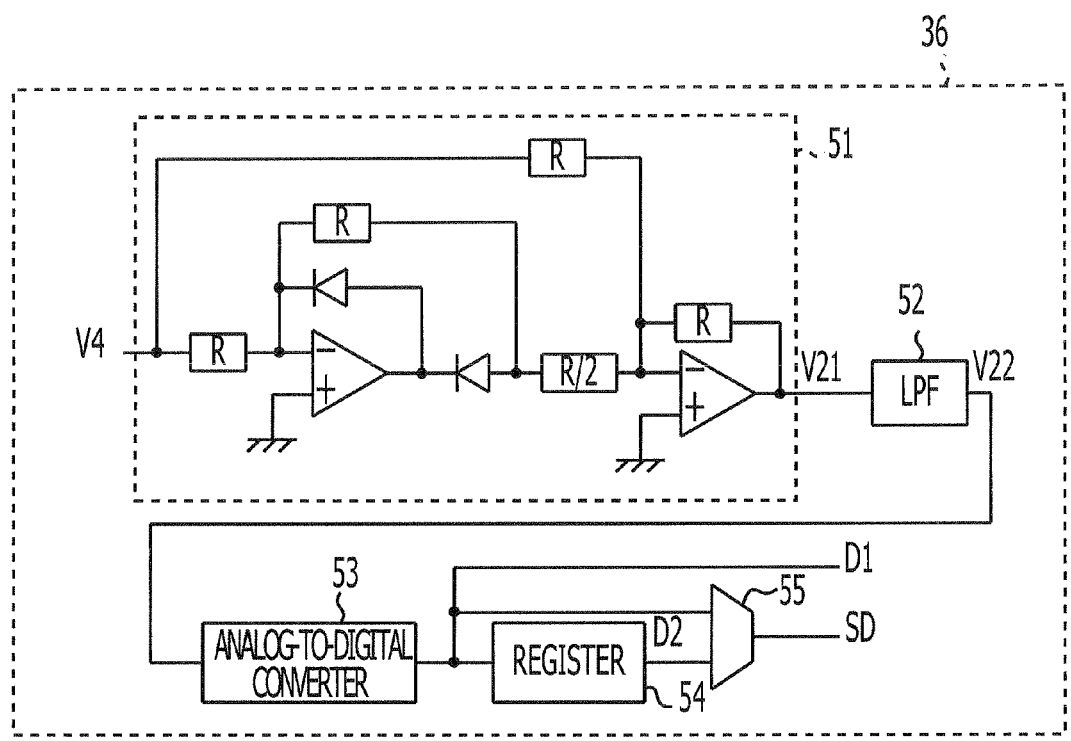
FIG. 5 is a circuit diagram illustrating an amplitude detection circuit.

FIG. 5 is a circuit diagram illustrating an amplitude detection circuit. As shown in FIG. 5, the amplitude detection circuit 36 includes a rectification circuit 51, a low-pass filter (LPF) 52, an analog-to-digital converter 53, a previous-value holding register 54, and a comparator 55.

The rectification circuit 51 outputs a voltage V21 generated by full-wave rectifying the third voltage V3. The LPF 52 outputs a voltage V22 obtained by averaging the voltage V21. The analog-to-digital converter 53 converts a voltage V22 to a digital value and outputs a digital value (signal) D1. The previous-value holding register 54 holds the value D1 output from the analog-to-digital converter 53 and outputs a value (signal) D2 that is equal to the held value.

The comparator 55 compares, in amplitude, the value D1 output from the analog-to-digital converter 53 with the value D2 output from the previous-value holding register 54, that is, the value held in the register 54, and outputs a detection signal SD on the basis of the comparison result. For example, when the value D1 output from the analog-to-digital converter 53 is larger than the value D2 held in the register 54, the comparator 55 outputs the detection signal SD having a high level. In addition, when the value D1 is smaller than the hold value D2, the comparator 55 outputs the detection signal SD having a low level.

The analog-to-digital converter 53 A/D-converts the voltage V22 in response to a start signal output from the adjustment circuit 37 and outputs the digital value D1 obtained with A/D conversion. The start signal can be supplied periodically during a predetermined period on the basis of a periodic signal such as a clock signal or the like. The previous-value holding register 54 holds an input signal in response to a trigger signal output from the adjustment circuit 37. According to an output signal, mentioned hereinafter, from the comparator 55, when the output value D1 of the analog-to-digital converter 53 is smaller than the hold value D2, the previous-value holding register 54 may hold the value D1 output from the analog-to-digital converter 53.

The adjustment circuit 37 adjusts the voltage division ratio of the voltage-dividing section 32, namely, the resistance value of the variable resistor VR3 on the basis of the detection signal SR (SH, SL, and SI) output from the polarity detection circuit 35. The detection signal SR (SH, SL, and SI) indicates whether or not the polarity of the difference voltage V4, namely, the level of the divided voltage V3 subtracted from the second voltage V2 is suitable. Accordingly, on the basis of the detection signal SR (SH, SL, and SI), the adjustment circuit 37 generates the control signal SC3 so as to increase or decrease the resistance value of the variable resistor VR3.

Figure 6:
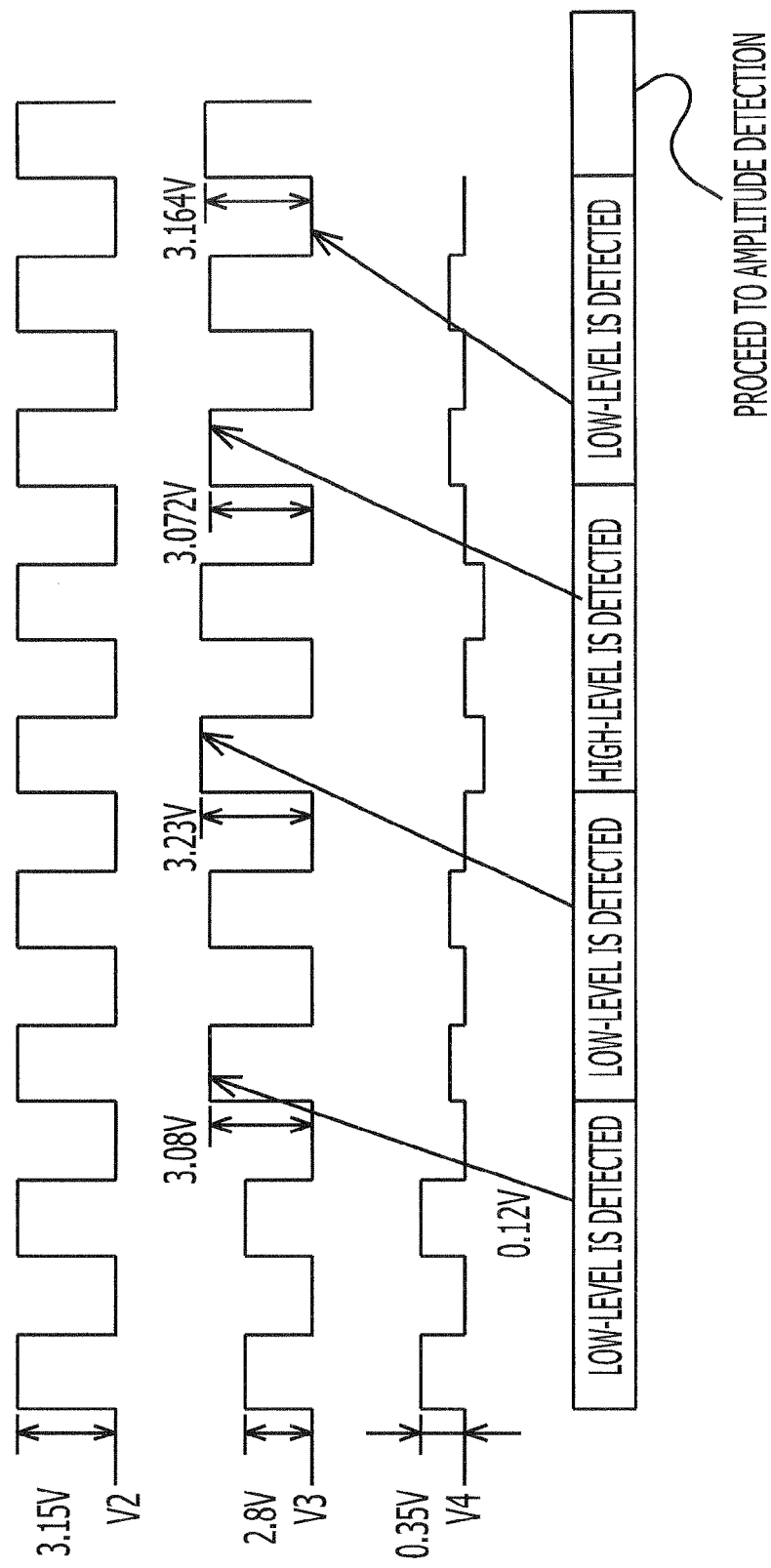
FIG. 6 is a timing chart illustrating polarity detection processing.

For example, as shown in FIG. 6, when the second voltage V2 is 3.15 V and the third voltage V3 is 2.8 V, the fourth voltage V4 turns out to be 0.35 V and the detection signal SL turns out to have a high level. Since the fourth voltage V4 is a positive voltage, the amount of subtraction for the second voltage V2 is small. Accordingly, the adjustment circuit 37 generates the control signal SC3 so that the third voltage V3 turns out to be higher than a current value, namely, the resistance value of the variable resistor VR3 turns out to be larger than a current value.

When the third voltage V3 turns out to be 3.23 V, the fourth voltage V4 turns out to be −0.08 V and the detection signal SL turns out to have a high level. Since the fourth voltage V4 is a negative voltage, the amount of subtraction for the second voltage V2 is large. Accordingly, the adjustment circuit 37 generates the control signal SC3 so that the third voltage V3 turns out to be lower than a current value, namely, the resistance value of the variable resistor VR3 turns out to be smaller than a current value.

When the third voltage V3 turns out to be 3.164 V, the fourth voltage V4 turns out to be −0.014 V and the detection signal SI turns out to have a high level. At this time, the signal S13 having a low level and the signal S13 having a high level are output from the logic circuit 47 alternately and repeatedly. This is because the fourth voltage V4 input to the comparator 42 is nearly equal to the average of the fourth voltage V4 and the comparator 42 outputs the signal S12 having a high level and the signal S12 having a low level alternately and repeatedly, owing to small fluctuation or the like of an input voltage to the comparator 42. Accordingly, the adjustment circuit 37 determines, on the basis of the detection signal SI having a high level, that the fourth voltage V4 is nearly equal to zero, and terminates the adjustment for the variable resistor VR3.

Next, the adjustment circuit 37 adjusts the resistance value of the variable resistor VR1 on the basis of data output from the amplitude detection circuit 36. The detection signal SD output from the comparator 55 indicates whether one of two digital values (output data from the analog-to-digital converter 53 and output data from the previous-value holding register 54) is larger or smaller than the other of the two digital values. Accordingly, by storing a digital value obtained before the variable resistor VR1 is adjusted into the register 54 and comparing the stored digital value with a digital value obtained after the variable resistor VR1 is adjusted, the adjustment circuit 37 can determine whether or not the adjustment for the variable resistor VR1 is suitable. The resistance value of the variable resistor VR1 is adjusted so as to minimize the amplitude of the fourth voltage V4, thereby allowing the transmission signal's influence on the reception signal to be reduced.

The rectification circuit 51 is used to determine the adjustment direction easily. An analog-to-digital converter that generates a digital value corresponding to a negative voltage can also be used. However, the variable resistor VR1 is adjusted so that the difference voltage V4 comes close to a minimum, namely, 0 V. Accordingly, the magnitude relation between the two digital values corresponding to before and after the adjustment, respectively, in the case of a digital value corresponding to a positive value differs from the magnitude relation in the case of a digital value corresponding to a negative value. Therefore, the voltage V21 obtained by full-wave rectifying the difference voltage V4 is converted to a digital value, namely, the absolute value of the difference voltage V4 is converted to a digital value. This provides an easy determination and adjustment.

The data D1 output from the analog-to-digital converter 53 corresponds to the amplitude value (voltage value) of the difference voltage V4. Accordingly, when the data D1 output from the analog-to-digital converter 53 is equal to or lower than a predetermined value, it can be determined that the difference voltage V4 is nearly equal to 0 V. Therefore, when the data D1 is equal to or lower than the predetermined value (for example, a digital value corresponding to 5 mV (millivolt)), the adjustment circuit 37 determines that the adjustment for the variable resistor VR1 is complete and terminates the processing.

Figure 7:
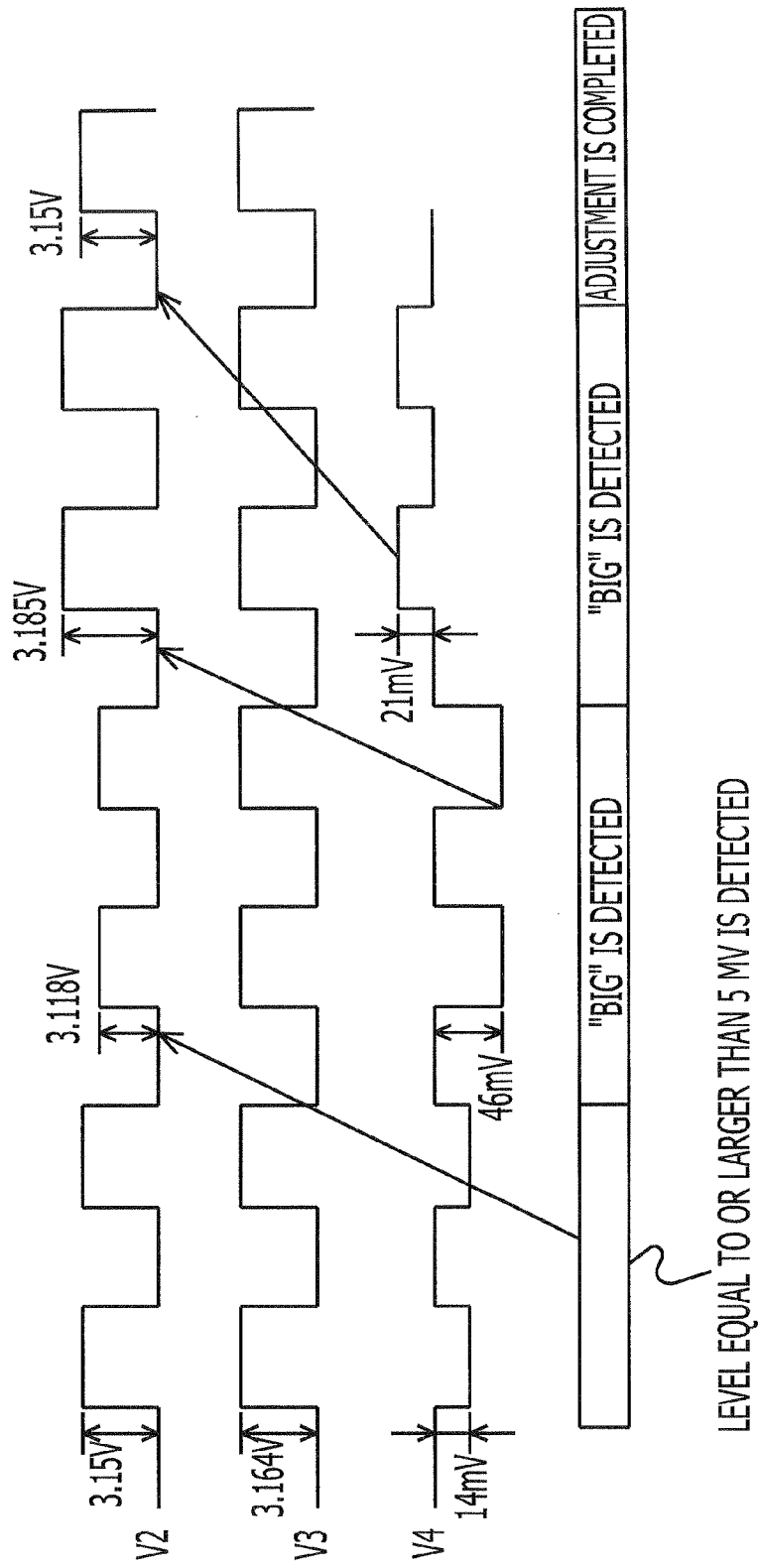
FIG. 7 is a timing chart illustrating amplitude detection processing.

For example, as shown in FIG. 7, when the second voltage V2 is 3.15 V and the third voltage V3 is 3.164 V, the amplitude of the fourth voltage V4 turns is 14 mV (the average value is 7 mV). Therefore, the adjustment circuit 37 generates the control signal SC1 so as to modify the resistance value of the variable resistor VR1. When the second voltage V2 is 3.118 V after the adjustment, the amplitude of the difference voltage V4 turns is 48 mV. Therefore, the adjustment circuit 37 generates the control signal SC1 so as to reverse the direction of change in the resistance value of the variable resistor VR1. The adjustment circuit 37 cancels the modification of a value in the register 54. The cancellation of value modification in the register 54 causes the register 54 to hold a minimum value.

When the second voltage V2 after the next adjustment is 3.185 V, the amplitude of the difference voltage V4 is 21 mV. The value is larger than the minimum value held in the register 54. Namely, even though the resistance value of the variable resistor VR1 is adjusted in any one of the increasing and decreasing directions of the resistance value, the difference voltage V4 increases. A resistance value corresponding to the value held in the register 54 causes the difference voltage V4 to be a minimum. Accordingly, the adjustment circuit 37 generates the control signal SC1 so that the resistance value of the variable resistor VR1 is adjusted to the resistance value corresponding to the value held in the register 54.

Figure 8:
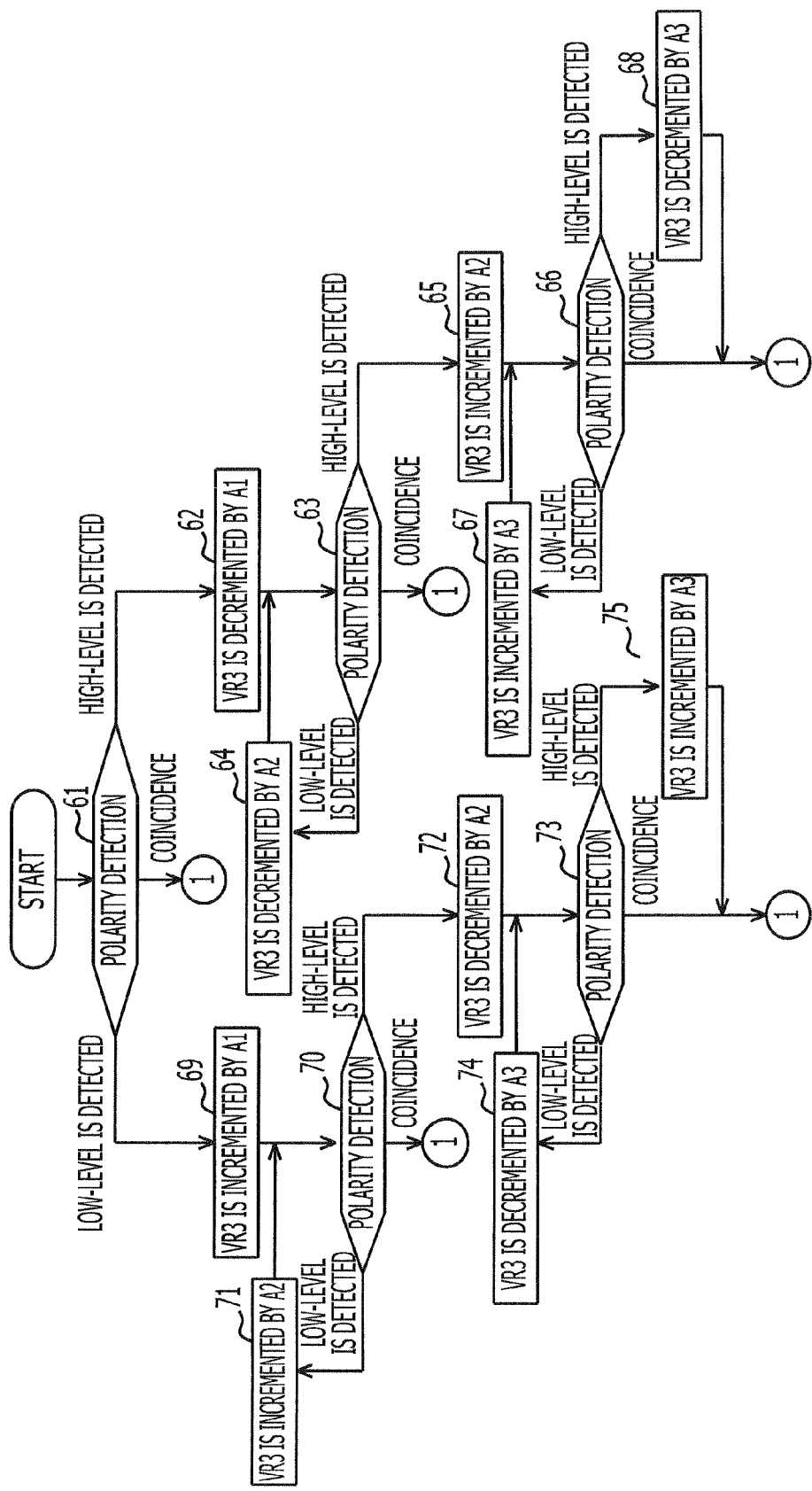
FIG. 8 is a flowchart illustrating polarity detection processing.

FIG. 8 is a flowchart illustrating polarity detection processing. As shown in FIG. 8, the control section 34 detects the polarity of the difference voltage V4 (61). In addition, in the case of high-level detection (the detection signal SH has a high level), the control section 34 decrements the resistance value of the variable resistor VR3 by a setting value A1 (for example, 10 percent of the maximum resistance value of the variable resistor VR3) (62).

Next, the control section 34 detects the polarity of the difference voltage V4 (63). In addition, in the case of high-level detection, the control section 34 decrements the resistance value of the variable resistor VR3 by a setting value A2 (for example, 5 percent of the maximum resistance value of the variable resistor VR3) (64), and detects the polarity of the difference voltage V4 (63) again. In the case of low-level detection (the detection signal SL has a high level), the control section 34 increments the resistance value of the variable resistor VR3 by the setting value A2 (5 percent of the maximum resistance value of the variable resistor VR3) (65).

Next, the control section 34 detects the polarity of the difference voltage V4 (66). In addition, in the case of low-level detection, the control section 34 increments the resistance value of the variable resistor VR3 by a setting value A3 (for example, 3 percent of the maximum resistance value of the variable resistor VR3) (67), and detects the polarity of the difference voltage V4 (63) again. In the case of high-level detection, the control section 34 decrements the resistance value of the variable resistor VR3 by the setting value A3 (68), and executes amplitude detection processing.

In the operation 61, in the case of low-level detection, the control section 34 increments the resistance value of the variable resistor VR3 by the setting value A1 (10 percent of the maximum resistance value of the variable resistor VR3) (69). Next, the control section 34 detects the polarity of the difference voltage V4 (70). In addition, in the case of low-level detection, the control section 34 increments the resistance value of the variable resistor VR3 by the setting value A2 (5 percent of the maximum resistance value of the variable resistor VR3) (71), and detects the polarity of the difference voltage V4 (70) again. In the case of high-level detection, the control section 34 decrements the resistance value of the variable resistor VR3 by the setting value A2 (5 percent of the maximum resistance value of the variable resistor VR3) (72).

Next, the control section 34 detects the polarity of the difference voltage V4 (73). In addition, in the case of high-level detection, the control section 34 decrements the resistance value of the variable resistor VR3 by the setting value A3 (3 percent of the maximum resistance value of the variable resistor VR3) (74), and detects the polarity of the difference voltage V4 (73) again. In the case of low-level detection, the control section 34 increments the resistance value of the variable resistor VR3 by the setting value A3 (3 percent of the maximum resistance value of the variable resistor VR3) (75), and executes the amplitude detection processing.

In addition, in each of the polarity detection operations (61, 63, 66, 70, and 73), in the case of coincidence detection (the detection signal SI has a high level), the control section 34 terminates the polarity detection processing and executes the amplitude detection processing.

The modification amount of the resistance value of the variable resistor VR3 is decreased sequentially. Accordingly, initially, the resistance value of the variable resistor VR3 is modified in a large step, thereby allowing the time taken for adjustment for the variable resistor VR3 to be shortened. When the modification step is set finely, the resistance value of the variable resistor VR3 can be adjusted accurately.

Figure 9:
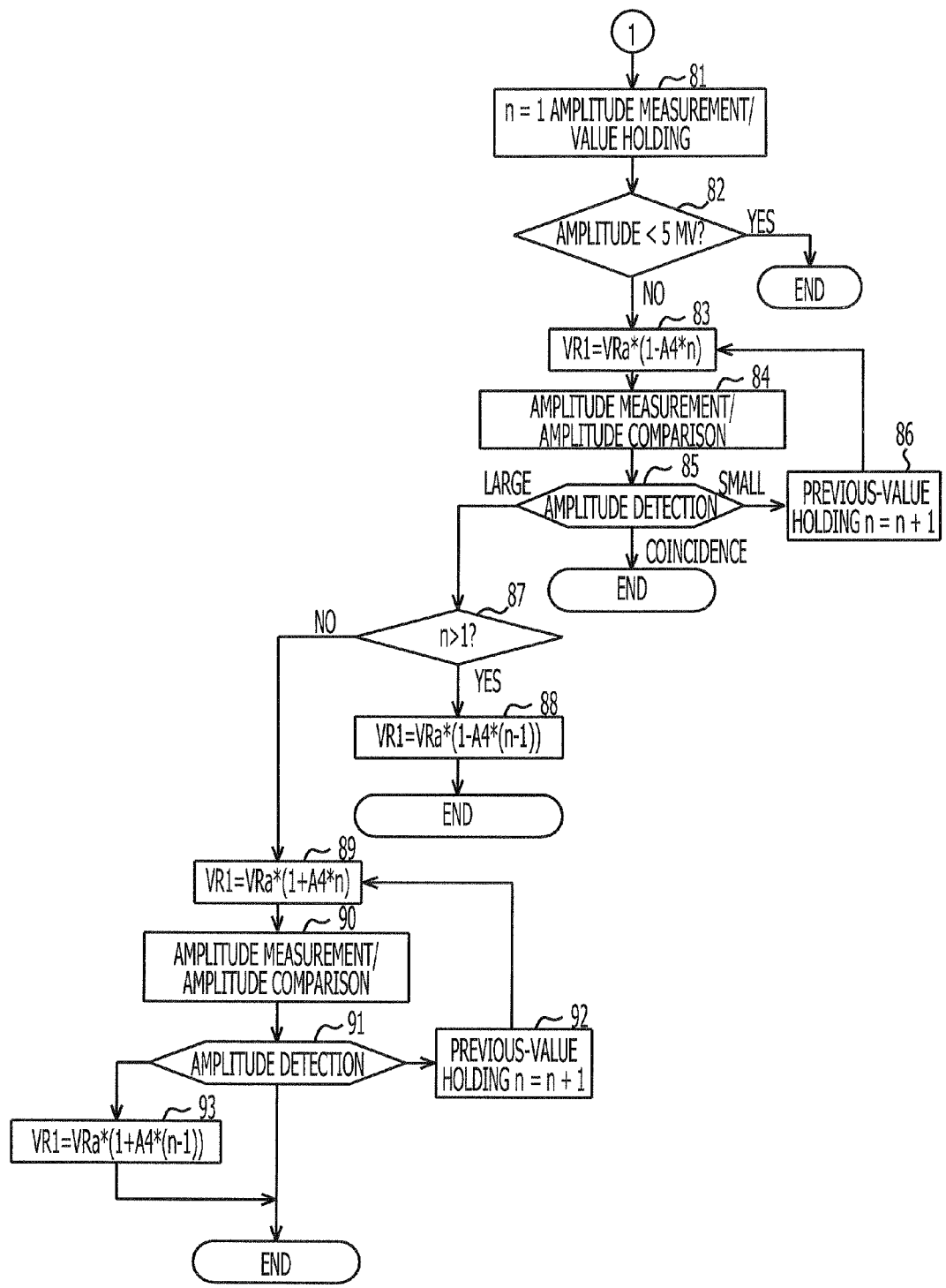
FIG. 9 is a flowchart illustrating amplitude detection processing.

FIG. 9 is a flowchart illustrating the amplitude detection processing. As shown in FIG. 9, the control section 34 initializes a count value n (n=1), measures an amplitude (A/D conversion is started), and causes the register 54 to hold a digital value to which the amplitude is converted (81). Next, the control section 34 determines whether or not the amplitude (digital value D1) is smaller than a predetermined value (5 mV) (82). In addition, when the amplitude is smaller than the predetermined value, the control section 34 determines that the adjustment is complete, and hence terminates the processing. When the amplitude is equal to or larger than the predetermined value, the control section 34 decrements the resistance value of the variable resistor VR1 by a predetermined value A4 (for example, 1 percent of the standard resistance value of the variable resistor VR1) (83). In the exemplary implementation, for example, the initial setting value of the variable resistor VR1 is VRa, and the modified resistance value VR1 (here, the same symbol is used) is obtained using the equation VR1=VRa*(1−A4*n). In the equation, since the predetermined value A4 multiplied by the count value n is subtracted from one, the resistance value turns out to be decreased. The value calculated using the equation mentioned above is the value of the control signal SC1.

Next, the control section 34 performs amplitude measurement and amplitude comparison (84), and determines the amplitude detection result (85). Regarding the determination of the amplitude detection result, when the digital value D1 is smaller than the predetermined value (a value corresponding to 5 mV), the control section 34 determines "coincidence", and performs amplitude determination using the detection signal SD.

When determining "coincidence", the control section 34 terminates the processing. When the detection signal SD indicates "small", namely, the adjusted digital value D1 is smaller than the value held in the register 54, the control section 34 causes the register 54 to hold the digital value D1, counts up the count value (n=n+1) (86), and modifies the resistance value of the variable resistor VR1 (83).

When the detection signal SD indicates "large", namely, the adjusted digital value D1 is larger than the value held in the register 54, the control section 34 determines whether or not the count value n is larger than one (87). When the register 54 holds a value, the count value n is incremented. Accordingly, in the case in which the count value n is larger than one, a minimum value exists by the operation 87 and the count value indicates the count value n (actually, n+1) that is used when a resistance value, set at the time of detection of a minimum value, is calculated. Accordingly, the control section 34 decrements the count value n by one (n−1) to calculate a resistance value and adjusts the variable resistor VR1 to the calculated resistance value.

On the other hand, in the case in which the count value n is one, since a minimum value does not exist by the operation 87, the control section 34 changes an adjustment direction, calculates the resistance value VR1 using the equation VR1=VRa*(1+A4*n), and adjusts the resistance value of the variable resistor VR1 (89).

Next, the control section 34 performs amplitude measurement and amplitude comparison (90), and determines the amplitude detection result (91). When determining "coincidence", the control section 34 terminates the processing.

When the detection signal SD indicates "small", the control section 34 causes the register 54 to hold the digital value D1, counts up the count value (n=n+1) (92), and modifies the resistance value of the variable resistor VR1 (89).

When the detection signal SD indicates "large", the control section 34 decrements the count value n by one (n−1) to calculate a resistance value and adjusts the variable resistor VR1 to the calculated resistance value (93). Then, the control section 34 terminates the processing.

As described above, according to the exemplary implementation, the driver circuit and adjustment method have the following advantages. First, using the voltage division ratio based on both the resistance values of the fixed resistor R2 and the variable resistor VR3, the voltage-dividing section 32 divides the first voltage V1 at a coupling point between the variable resistor VR1 and the output section 31 and generates the third voltage V3. The input section 33 generates the fourth voltage V4 by subtracting the third voltage V3 from the second voltage V2. The polarity detection circuit 35 compares the polarity of the fourth voltage V4 with the polarity of the third voltage V3 and outputs the detection signal SR1 according to the comparison result. On the basis of the detection signal SR1 output from the polarity detection circuit 36, the adjustment circuit 37 adjusts the resistance value of the variable resistor VR3 so that the polarity of the fourth voltage V4 matches the polarity of the third voltage V3. As a result, the divided voltage V3 generated for removing a transmission voltage from a reception voltage can be adjusted easily, thereby allowing the deterioration of a reception status to be prevented.

Second, the amplitude detection circuit 36 detects the amplitude of the fourth voltage V4 output from the input section 33 and outputs the detection signal SR2 corresponding to the detection result. The adjustment circuit 37 adjusts the variable resistor VR1 on the basis of the detection signal SR2. As a result, impedance mismatching, namely, the difference between the resistance value of the variable resistor VR1 and the characteristic impedance of the transmission line 12 can be reduced, thereby allowing the deterioration of a reception status to be prevented.

The exemplary implementation described above can be implemented in the following way. While, in the exemplary implementation described above, the third voltage V3 is supplied to the comparator 41 in the polarity detection circuit 35 and the polarity of the fourth voltage V4 is determined, the polarity of the fourth voltage V4 can be determined using the second voltage V2.

While, in the exemplary implementation described above, the transmission line 12 is a coaxial cable, a cable having another type of structure, for example, a twisted pair cable can be used as the transmission line 12. While, in the exemplary implementation described above, the fixed resistor R2 included in the voltage-dividing section 32 is coupled to the node N1, the variable resistor VR3 can be coupled to the node N1.

In the exemplary implementation t, a variable resistor can be used as the resistor R2 included in the voltage-dividing section 32.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although exemplary implementations of the present inventions have been described in detail, it should be understood that the various changes, substitutions, and alterations could be made hereto without departing from the spirit and scope of the invention.

What is claimed is:

1. A driver circuit comprising:
   an output section;
   a voltage-dividing section configured to divide a first voltage at a coupling point between the output section and a termination resistor;
   a comparison section configured to compare a voltage difference with one of the first voltage and a second voltage, the voltage difference being a difference between the second voltage at a coupling point between the termination resistor and a transmission path and a third voltage output from the voltage-dividing section; and
   an adjustment section configured to adjust a voltage division ratio of the voltage-dividing section on the basis of the comparison result obtained in the comparison section.

2. The driver circuit according to claim 1, wherein
   the comparison section compares the polarity of the voltage difference with one of the polarities of the first voltage and the second voltage.

3. The driver circuit according to claim 2, wherein
   the adjustment section adjusts the voltage division ratio so that a difference between the voltage difference and one of the first voltage and the second voltage decreases.

4. The driver circuit according to claim 1, wherein
   the adjustment section reduces a variation width of the voltage division ratio as the number of times the adjustment is performed increases.

5. The driver circuit according to claim 1, further comprising:
   a rectification section configured to rectify the first voltage; and
   a termination resistance adjustment section configured to adjust the resistance value of the termination resistor in response to a rectification result obtained in the rectification section.

6. The driver circuit according to claim 5, wherein
the termination resistance adjustment section reduces a variation width of the resistance value of the termination resistor as the number of times the adjustment is performed increases.

7. An adjustment method for a driver circuit, comprising:
comparing a voltage difference with one of a first voltage and a second voltage, the voltage difference being a difference between a third voltage, obtained by dividing the first voltage at a coupling point between an output section and a termination resistor, and the second voltage obtained at a coupling point between the termination resistor and a transmission path; and
adjusting a voltage division ratio used for generating the third voltage, on the basis of the comparison result.

8. The adjustment method for the driver circuit according to claim 7 wherein
the comparing includes comparing the polarity of the voltage difference with one of the polarities of the first voltage and the second voltage.

9. The adjustment method for the driver circuit according to claim 7 wherein
the voltage division ratio is adjusted so that a difference between the voltage difference and one of the first voltage and the second voltage decreases.

10. The adjustment method for the driver circuit according to claim 7, wherein
the voltage division ratio is adjusted so that a variation width of the voltage-dividing ratio is reduced as the number of times the adjustment is performed increases.

11. The adjustment method for the driver circuit according to claim 7, wherein
in the comparing, the first voltage is rectified; and
the resistance value of the termination resistor is adjusted on the basis of the rectification result.

12. The adjustment method for the driver circuit according to claim 11, wherein
the resistance value of the termination resistor is adjusted so that a variation width of the resistance value of the termination resistor is reduced as the number of times the adjustment is performed increases.

* * * * *